United States Patent

Carp et al.

[15] 3,640,588

[45] Feb. 8, 1972

[54] MEANS FOR DELAYING EFFECTIVE CONTROL OF VEHICLE BRAKING BY AN ADAPTIVE BRAKING SYSTEM UNTIL CERTAIN WHEEL VELOCITY AND DECELERATION CONDITIONS HAVE BEEN SATISFIED

[72] Inventors: Ralph W. Carp, Baltimore; Frederick O. Miesterfeld, Jopps, both of Md.

[73] Assignee: The Bendix Corporation

[22] Filed: Mar. 3, 1970

[21] Appl. No.: 16,166

[52] U.S. Cl. ..........................303/21 P, 188/181 R, 303/20, 303/21 BE
[51] Int. Cl. ..........................................B60t 8/08, B60t 8/12
[58] Field of Search ...............188/181; 303/20, 21; 307/120; 317/5; 318/52; 324/161; 340/263

[56] References Cited

UNITED STATES PATENTS

| | | | |
|---|---|---|---|
| 3,245,727 | 4/1966 | Anderson et al. | 303/21 EB |
| 3,362,757 | 1/1968 | Marcheron | 303/21 P |
| 3,401,984 | 9/1968 | Williams et al. | 303/21 BE |
| 3,494,671 | 2/1970 | Slavin et al. | 303/21 P |

*Primary Examiner*—Trygve M. Blix
*Assistant Examiner*—Stephen G. Kunin
*Attorney*—Plante, Arens, Hartz, Smith & Thompson, Bruce L. Lamb and William G. Christoforo

[57] ABSTRACT

In an adaptive braking system for automobiles, trucks and the like there is provided apparatus for delaying automatic braking control of the vehicle until, after the brakes are applied, a controlled wheel attains a first level of negative acceleration (deceleration) and thereafter the time integral of wheel acceleration attains a level related to controlled wheel speed.

14 Claims, 4 Drawing Figures

PATENTED FEB 8 1972 3,640,588
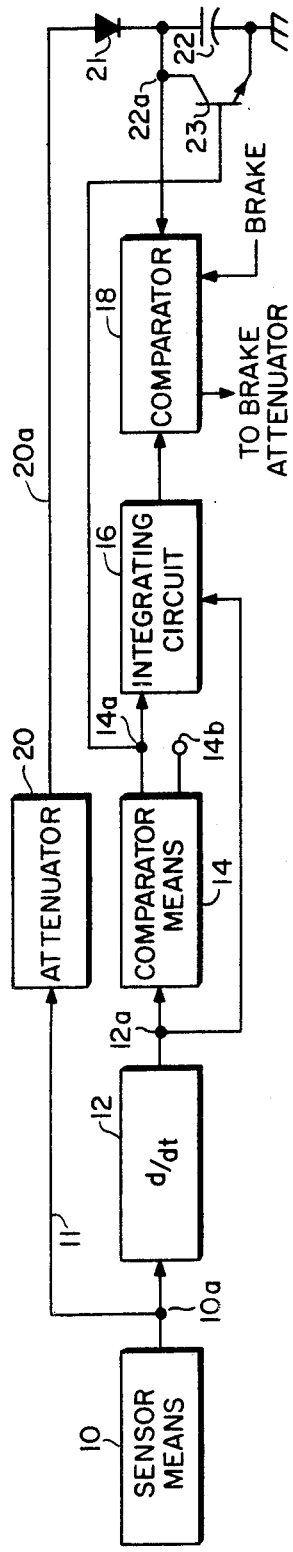
FIG. 1
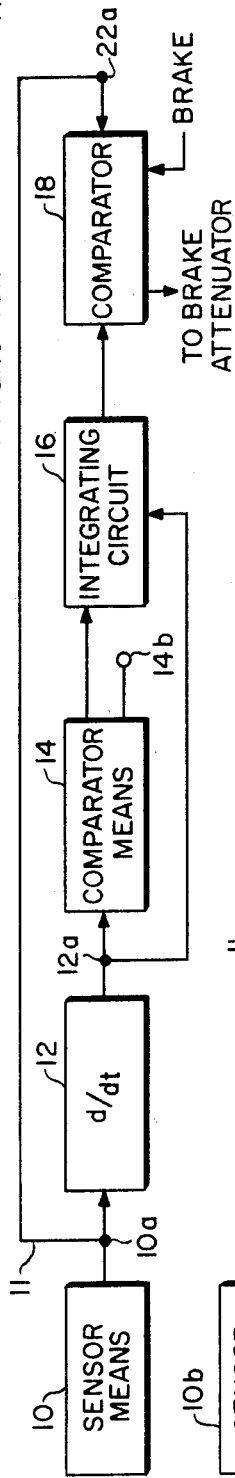
FIG. 2
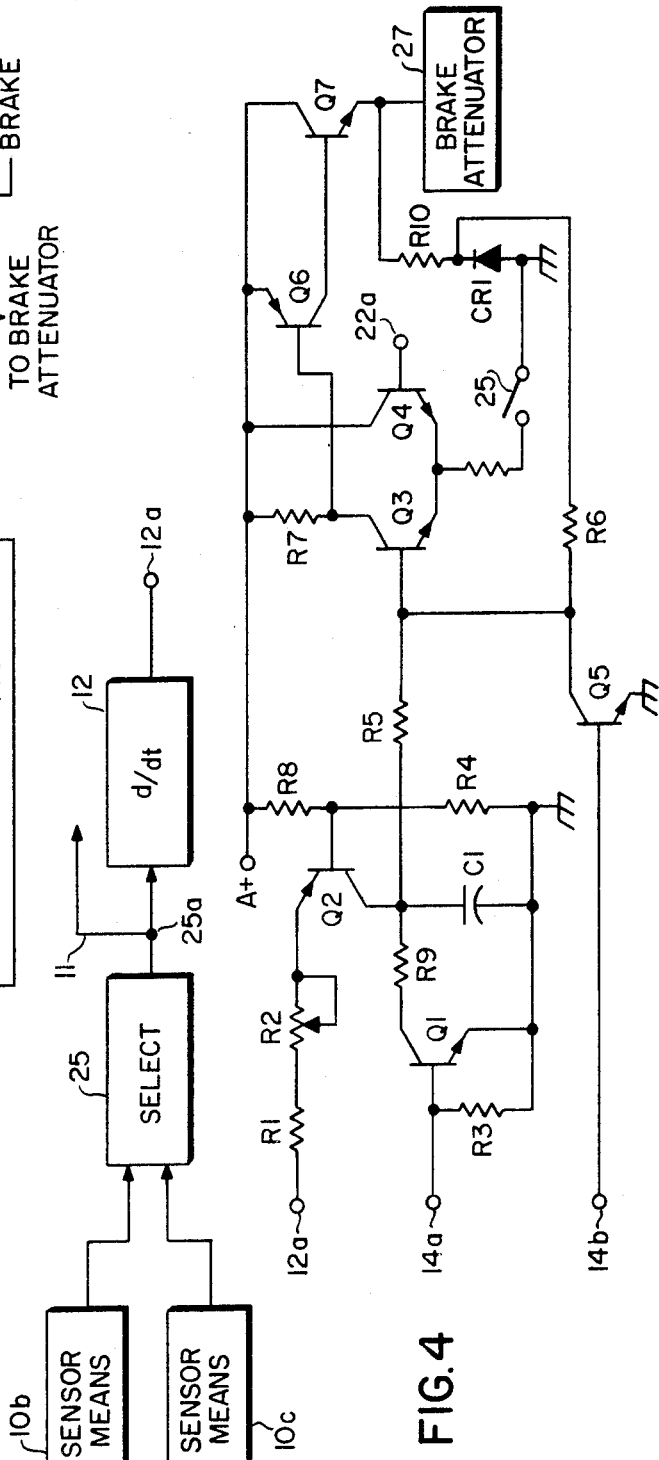
FIG. 3
FIG. 4
INVENTORS
RALPH W. CARP
FREDERICK O. MIESTERFELD
BY
William G. Christoforo
ATTORNEY

MEANS FOR DELAYING EFFECTIVE CONTROL OF VEHICLE BRAKING BY AN ADAPTIVE BRAKING SYSTEM UNTIL CERTAIN WHEEL VELOCITY AND DECELERATION CONDITIONS HAVE BEEN SATISFIED

CROSS-REFERENCES TO RELATED PATENT APPLICATIONS

The delay means disclosed herein is an improvement for automobile, truck and the like adaptive braking systems of the type disclosed in a patent application for "Automobile Anti-Skid Control System" by M. Slavin et al., application Ser. No. 712,672, filed Mar. 13, 1968, now U.S. Pat. No. 3,494,671 and which is assigned to the assignee in the present application. The prior application is specifically referred to below and hereby incorporated by reference.

BACKGROUND OF THE INVENTION

This invention relates to adaptive braking systems for automobiles and the like and more particularly to adaptive braking systems which delay assuming automatic braking control of a controlled wheel until the controlled wheel attains a first deceleration (negative acceleration) level and thereafter satisfies certain wheel acceleration and velocity requirements.

The wheel braking pressure which can be exerted by a motor vehicle operator is sufficient to cause the wheels to lock with resultant increase in stopping distance and reduced lateral vehicle stability. This is especially true when driving on low frictional coefficient surfaces. However, it is possible to optimize braking characteristics of a wheeled vehicle under any tire-road interface condition by providing the vehicle with an adaptive braking system which will modulate the braking pressure to a pressure which maximizes the frictional force at the tire-road interface. In the aforementioned patent application there is described an adaptive braking system which is composed basically of an electronic control channel for each wheel or group of wheels to be controlled. Briefly, a control channel includes a wheel sensor means which generates a DC voltage level proportional to wheel rotational speed, a derivative amplifier which generates a DC voltage level proportional to wheel acceleration and a number of comparators which compare actual wheel acceleration (or deceleration) with fixed reference levels corresponding to predetermined values of wheel acceleration and deceleration to generate error signals. The error signals are applied to means which in response thereto vary brake fluid pressure at the controlled wheel to maintain wheel slip at a point which tends to maximize the frictional force developed at the tire-road interface. The aforementioned system is partially activated when the vehicle operator depresses his brake pedal and resultant wheel deceleration reaches a first of the said reference levels which corresponds to a fixed amount of wheel deceleration. Thereafter, automatic braking control of the controlled wheel is delayed until certain wheel velocity criteria have been satisfied. In particular, if during a predetermined time period after the wheel has decelerated to the first reference level, wheel speed drops to or below a certain percentage of the wheel speed at the time the brakes were applied, the adaptive braking system is fully activated and the brake fluid pressure at the controlled wheel is thereafter automatically varied as the vehicle is brought to a controlled stop. The advantages of this type of delay can be seen when it is considered that a brake control wheel may strike an imperfection in the road's surface, momentarily imparting a high level of wheel deceleration to the wheel, possibly causing the automatic adaptive braking system which is not equipped with such a delay means to assume control of the braking even though optimum braking characteristics would have been obtained in that case through continued manual control of the braking system.

Certain other adaptive braking systems have mitigated this problem by providing a means in the form of an integrating circuit for delaying automatic braking control until the control wheel has attained a predetermined deceleration and thereafter the integral of deceleration with respect to real time becomes equal to a predetermined constant. It should be noted that using the integrating delay technique just described the same absolute change of vehicle wheel speed is required to initiate automatic control regardless of the actual wheel speed whereas those adaptive braking systems having delay means dependent upon wheel velocity changing a predetermined percentage of initial wheel velocity, as earlier described, is more truly adaptive since the delay period is dependent upon actual wheel velocity.

SUMMARY OF THE INVENTION

This initial delay can be made even more adaptive by a means which compute the correct delay time from both wheel velocity and wheel deceleration information. The circuit described herein performs this computation by integrating the output of the derivative amplifier after the wheel has accelerated past the first reference deceleration level and comparing this integrated result to the instantaneous wheel speed. A second means described herein which embodies the invention is a slightly modified form performs the delay computation by comparing integrated output of the derivative amplifier with wheel speed as memorized at some predetermined point in the braking cycle. It is thus one object of this invention to provide an adaptive braking system for a wheeled vehicle having means delaying the automatic control of the vehicle braking system.

It is still another object of this invention to provide a delay means for an adaptive braking system which is more fully responsive to actual wheel dynamic conditions than earlier known delay means.

It is another object of this invention to provide such a delay means which operates in response to wheel velocity and wheel acceleration.

In the aforementioned patent application there was explained how an adaptive braking system delay means assured that automatic braking control was assumed only after the controlled wheel had passed over the maximum point of the mu-slip curve, which is a plot of the tire-road interface frictional force versus wheel slip, curves which are well known in the art. So also the delay means described herein will assure that automatic braking control will be assumed only after the controlled wheel has passed over the maximum point of the mu-slip curve. Additionally, it will be explained how this can be accomplished by adjustment of certain circuit parameters. It is thus one further object of this invention to provide delay means for an adaptive braking system which will delay automatic braking control of a controlled wheel until the wheel has passed over the maximum point of the mu-slip curve.

These and other objects of the invention will become obvious in the following description of the invention.

BRIEF DESCRIPTION OF THE DRAWINGS

FIG. 1 is a block diagram which illustrates the use of the invention including means for memorizing wheel speed in an adaptive braking system control channel.

FIG. 2 is a block diagram of an adaptive braking system control channel which includes the invention in a simplified form.

FIG. 3 is a block diagram showing a partial adaptive braking system control channel for controlling a group of wheels in response to input signals from one of the wheels and which includes the inputs to the invention as shown in FIGS. 1 and 2.

FIG. 4 is a schematic of a circuit which illustrates the preferred embodiment of the invention.

DESCRIPTION OF THE PREFERRED EMBODIMENTS

Referring to the figures wherein like numerals refer to like elements and referring particularly to FIG. 1, there is seen a block diagram of an adaptive braking system control channel. The sensor means 10 includes a wheel speed sensor mounted upon and sensing the rotational speed of a wheel whose braking characteristics are to be controlled, the sensor generating a frequency linearly related to wheel speed which is converted to a DC voltage level proportional to wheel rotational speed. This wheel speed signal appears on sensor output terminal 10a and is supplied to a derivative amplifier 12 which generates in response thereto a DC voltage level proportional to wheel acceleration on terminal 12a. The wheel acceleration signal is applied to comparator means 14 wherein it is compared to various reference levels with the comparator means generating output signals whenever the sensed wheel attains these reference levels. For example, comparator means 14 generates an output, called hereinafter a G, signal, on terminal 14a when the wheel attains a first $G_1$ reference level. Comparator means suitable for use with this invention are generally well known to those skilled in the art. For example, a suitable comparator means can be comprised of a first comparator which compares the signal at terminal 12a against a $G_1$ reference which corresponds to a level of wheel deceleration, and a second comparator which compares the signal at terminal 12a against a $G_2$ reference which corresponds to a level of wheel deceleration less than the $G_1$ level, which, of course, might be zero deceleration or even some positive acceleration level. A particular comparator means suitable for use with this invention is shown in the aforementioned U.S. patent where the $-g_1$ and $+g_1$ reference levels seen in the aforementioned patent correspond respectively to the $G_1$ and $G_2$ reference levels here. And produces a second output, called hereinafter a $G_2$ signal, when the wheel thereafter attains a $G_2$ reference level. An integrating circuit 16 is triggered by the $G_1$ signal and thereafter integrates the output of the differential amplifier 12 as sampled at terminal 12a. The output of the integrating circuit is thus the integral of an acceleration with respect to time, an output which has velocity dimensions, this output signal being applied to comparator 18. The wheel speed signal on terminal 10a, which it will be remembered, is a DC voltage level proportional to wheel speed, is applied via line 11 to attenuator 20, the output of which appears on line 20a and which comprises a second speed signal related to the signal on terminal 10a. The second speed signal is applied through diode 21 to terminal 22a. A memory capacitor 22 is connected between a constant voltage source, suitably ground, and terminal 22a. A normally conductive transistor 23 has its collector-emitter circuit connected across capacitor 22 and its base electrode connected to receive the $G_1$ signal from comparator means 14. Transistor 23 is rendered nonconductive by the $G_1$ signal. It can be seen that before the sensed wheel attains the $G_1$ reference level so that transistor 23 collector-emitter circuit shunts capacitor 22, no voltage can appear across capacitor 22. However, when the $G_1$ signal is generated, transistor 23 turns off and the second speed signal from attenuator 20 will now appear across capacitor 22. Diode 21 now prevents the signal stored across capacitor 22 from bleeding off through the attenuator. It should be obvious that this second speed signal could be memorized at other times during the braking cycle such as the instant at which the brakes are applied by connecting the base of transistor 23 to a switch ganged to the vehicle braking system. The memorized signal is compared to the output of the integrating circuit in comparator 18, with the comparator being effective only during the time that the brakes are applied. When the comparison comes within predetermined bounds the comparator 18 output signal is applied to the brake attenuator to relieve the braking pressure. In a practical adaptive braking system the dynamic range of the derivative amplifier 12 is usually restricted at the high deceleration levels because of the desire to improve the voltage output to deceleration ratio at the lower deceleration levels at which the system would normally operate. Thus, if the wheel were decelerating rapidly at high deceleration levels, as might occur while stopping on icy or otherwise slippery surfaces, derivative amplifier 12 can be limited so that its output would not be truly indicative of the wheel conditions then existing. It this latter case the delay period is unduly extended so that the wheel may actually lock before automatic brake control is assumed. FIG. 2 shows a simpler form of the invention which also cures the above cited defect by comparing the integrated output of the derivative amplifier with the instantaneous wheel speed. Referring now to FIG. 2 it can be seen that the speed signal output of sensor means 10 which appears on terminal 10a is applied directly via line 11 to the input terminal 22a of comparator 18. As before, the speed signal is differentiated in derivative amplifier 12 with a voltage level corresponding to wheel acceleration (or deceleration) appearing on terminal 12a. Comparator means 14 generates output signals at least when the acceleration level attains a $G_1$ and a $G_2$ reference level, the $G_1$ signal being used to trigger integrating circuit 16 to thereafter integrate the acceleration signal from derivative amplifier 12 with respect to time. The output of integrating circuit 16 is now compared with the instantaneous wheel speed in comparator 18. It should now be obvious that as the results of the integration increase, the instantaneous speed signal decreases. Comparator 18 is arranged to generate an error signal when its two input signals being compared are equal, with the error signal being applied to a brake attenuator to effect attenuation of the wheel braking force.

Referring now to FIG. 3 which is a block diagram showing a partial adaptive braking system control channel for controlling a group of wheels in response to input signals from one of the wheels, a type of control channel which is known in the art and which includes a sensor means 10b which responds to the rotation of a first wheel to be controlled, and a sensor means 10c which responds to the rotation of a second wheel to be controlled, sensing means 10b and 10c being identical to the sensor means 10 of FIGS. 1 and 2. In other words, the output of sensor means 10b is a DC voltage level proportional to the rotational speed of the first wheel and the output of sensor means 10c is a DC level proportional to the rotational speed of the second wheel. These speed signals are applied to select circuitry 25 which selects one of the speed signals in accordance with their characteristics, either selecting at the option of the system designer the speed signal from the faster wheel or the speed signal from the slower wheel, this selected speed signal now appearing on output terminal 25a. Circuitry for selecting the higher speed signal and circuitry for selecting the lower speed signal, either of which can be used with this invention at the option of the system designer, is shown in the aforementioned U.S. patent. Briefly, these selecting circuits suitably comprise differentially connected transistors poled and biased to pass only the desired signal. Output terminal 25a in FIG. 2 corresponds to output terminal 10a in FIGS. 1 and 2 with the blocks to the right of terminal 25a being identical to the blocks shown to the right of terminal 10a in either FIG. 1 or FIG. 2. That is, the speed signal is applied to a derivative amplifier 12 with a DC voltage level signal proportional to wheel acceleration appearing on line 12a and the speed signal additionally being applied via line 11 to a memory if the embodiment of FIG. 1 is used or via line 11 directly to input terminal 22a if the embodiment of FIG. 2 is used.

Referring now to FIG. 4, the $G_1$ signal from comparator means 14 is applied to terminal 14a which is connected to the base electrode of transistor $Q_1$. In the embodiment shown the $G_1$ signal is of such polarity as to render transistor $Q_1$ nonconductive while in the absence of the $G_1$ signal $Q_1$ is conductive hence shunting capacitor $C_1$. The output from derivative amplifier 12 is applied from terminal 12a and through resistors $R_1$ and potentiometer $R_2$ to the emitter electrode of transistor $Q_2$. This latter transistor is biased at its base electrode by a constant voltage derived from the voltage divider comprised of resistors $R_4$ and $R_8$ connected across the regulated A+ voltage supply. This base bias is set to just cutoff current through transistor $Q_2$ emitter-collector circuit when a signal corresponding to zero wheel acceleration is impressed on terminal 12a. Transistor $Q_2$ as biased will be recognized as a constant current source so long as it is not saturated. Thus, when the wheel decelerates, the resultant signal on terminal 12a will cause transistor $Q_2$ to generate a current proportional to the terminal 12a signal level, which it will be remembered is proportional to wheel acceleration. Before the $G_1$ signal is generated capacitor $C_1$ is maintained in the discharged state. However, when the $G_1$ signal is generated, indicating that the controlled wheel has attained the $G_1$ reference level, transistor $Q_1$ is turned off and thereafter current will flow into capacitor $C_1$ from the current source $Q_2$ at a rate, assuming $R_2$ remains constant, determined by the signal on terminal 12a.

It should be obvious that by eliminating the constant current source or by allowing transistor $Q_2$ to operate in its saturated region, the circuit comprised of capacitor $C_1$ and resistors $R_1$ and $R_2$ will operate as an RC circuit and such operation is within the scope of this invention. However, it is preferred, as shown in this embodiment, that the rate of charge buildup in capacitor $C_1$ be directly related to the acceleration signal to thus eliminate the nonlinearities introduced by an RC circuit.

It should also be obvious that the charge storage circuit comprised of capacitor $C_1$, resistors $R_1$ and $R_2$ and transistor $Q_2$ is suitably scaled with regard to the signal on terminal 22a to cause the comparator comprised of differentially connected transistor $Q_3$ and $Q_4$ to generate its error signal in accordance with the criteria set by the system designer. And conversely, it is possible through the use of obvious means to scale the signal appearing on terminal 22a with regard to the circuit constants of the charge storage circuit to obtain operation of the circuit as desired by the system designer.

A resistor $R_9$ is provided in the discharge path of capacitor $C_1$ through the emitter-collector circuit of transistor $Q_1$. Thus, if during the integration period transistor $Q_1$ should be rendered momentarily conductive, as for example, by noise in the circuit, capacitor $C_1$ would not be completely discharged thereby but would retain the majority of its then acquired charge.

The comparator comprised of transistors $Q_3$ and $Q_4$ corresponds to comparator 18 seen in FIGS. 1 and 2. It accordingly receives the speed signal as one input at the base electrode of transistor $Q_4$ on terminal 22a. The integrated derivative signal appearing across capacitor $C_1$ is applied to the second input of the differential amplifier, the base electrode of transistor $Q_3$, through resistor $R_5$. This comparator remains unenergized until switch 25 which is connected to the vehicle brake pedal is closed by actuation thereof. The collector electrode of transistor $Q_4$ is connected to a regulated A+ supply, while the collector of transistor $Q_3$ is connected through resistor $R_7$ to the regulated A+ supply. Normally transistor $Q_4$ is conductive, however, when the integrated differential signal appearing at the base electrode of transistor $Q_3$ becomes equal to and exceeds the speed signal at the base of transistor $Q_4$, transistor $Q_3$ becomes conductive and a resultant signal at its collector electrode is applied to the base electrode of transistor $Q_6$ thus rendering that transistor and transistor $Q_7$ conductive. This energizes brake attenuator 27 to thus attenuate the braking pressure in a manner well known to those skilled in the art. Transistor $Q_3$ remains conductive until the $G_2$ signal is generated indicating that the controlled wheel has attained the second reference acceleration level.

Feedback from the brake attenuator applied through resistors $R_{10}$ and $R_6$ to the base electrode of transistor $Q_3$ maintains that transistor conductive, thus latching brake attenuator 27 in the energized state. This prevents brake attenuator 27 from being deenergized even though the $G_1$ signal may disappear from terminal 14a, an indication that the braking pressure at the controlled wheel has been released, at least in part. The brake attenuator thus remains energized until the controlled wheel attains the $G_2$ level at which time it will be remembered comparator means 14 (FIGS. 1 or 2) generates a positive going signal on terminal 14b which is applied to the base electrode of transistor $Q_5$. Transistor $Q_5$, which is normally cut off, is now rendered conductive grounding the base electrode of transistor $Q_3$ through the collector-emitter circuit of transistor $Q_5$. Thus, assuming the $G_1$ signal on terminal 14a has already been extinguished, transistor $Q_3$ is cut off, resulting in the deenergizing of brake attenuator 27.

Although only certain embodiments of the invention have been shown and the invention has been shown in the environment of an adaptive braking system described in a previous patent application, it should be obvious the invention can be used with other adaptive braking systems having suitable signals, for example, signals corresponding to the $G_1$ and $G_2$ signals described herein. It should also be noted that the exact form of brake attenuator does not comprise a part of the invention herein, and indeed, the invention may be used with any type of braking system, for example, hydraulic, pneumatic etc., the attenuator being properly chosen. Accordingly, the inventors claim the subject matter within the true scope and spirit of the appended claims.

The invention claimed is:

1. In a wheeled vehicle having a wheel braking system whereby said vehicle wheels are braked by a braking force and an adaptive braking control channel including means for generating a first signal proportional to rotational speed of one of said wheels, means for generating a second signal proportional to rotational acceleration of said wheel, means for generating a third signal when said second signal attains a first reference level and means responsive to an error signal for attenuating said braking force, an improvement to said adaptive braking control channel comprising:
   means actuated by said third signal for integrating said second signal with respect to time; and,
   comparator means for comparing said first signal with said integrated signal to generate said error signal.

2. An improvement to an adaptive braking control channel as recited in claim 1 with additionally:
   means for scaling said first signal, said comparator means comparing said scaled first signal with said integrated signal to generate said error signal.

3. An improvement to an adaptive braking control channel as recited in claim 1 with additionally:
   memory means triggered at a predetermined time in the braking cycle of said wheel for memorizing a portion of said first signal, said comparator means comparing said memorized signal with said integrated signal to generate said error signal.

4. An improvement to an adaptive braking control channel as recited in claim 1 with additionally:
   memory means triggered by said third signal for memorizing a portion of said first signal, said comparator means comparing said memorized signal with said integrated signal to generate said error signal.

5. An improvement to an adaptive braking control channel as recited in claim 1 wherein said control channel additionally includes means for generating a fourth signal when said second signal attains a second reference level and wherein said comparator means additionally includes latching means for latching said error signal on, said latching means being responsive to said fourth signal for unlatching itself to thereby extinguish said error signal.

6. An improvement to an adaptive braking control channel as recited in claim 5 wherein said latching means comprises a feedback circuit connecting the output terminal of said comparator means to a first input terminal of said comparator means, said error signal being generated on said output terminal and said integrated signal being applied at said first input terminal, said latching means additionally comprising unlatching means responsive to said fourth signal for interrupting said feedback circuit.

7. An improvement to an adaptive braking control channel as recited in claim 1 wherein said integrating means comprises:
   a charge storage device;
   normally conductive means for discharging said charge storage device, said normally conductive means being responsive to said third signal for rendering it nonconductive; and,
   means responsive to said second signal for supplying current to said charge storage device.

8. An improvement to an adaptive braking control channel as recited in claim 1 wherein said integrating means comprises:
a charge storage device;
normally conductive means for discharging said charge storage device, said normally conductive means being responsive to said third signal for rendering it nonconductive; and,
a constant current source responsive to said second signal to set the current supplied thereby, for supplying current to said charge storage device, the charge stored in said charge storage device being correlated to said integrated second signal.

9. An improvement to an adaptive braking control channel as recited in claim 8 wherein:
said charge storage device comprises a capacitor; and,
said normally conductive means comprises a second transistor having a collector-emitter circuit shunting said capacitor and a base electrode connected to said means for generating a third signal.

10. An improvement to an adaptive braking control channel as recited in claim 9 wherein said normally conductive means comprises a transistor having a collector-emitter circuit shunting said capacitor, and a base electrode connected to receive said third signal.

11. An improvement to an adaptive braking control channel as recited in claim 10 with additionally resistance means connected in said collector-emitter circuit for inhibiting discharge of said capacitor when said transistor is conductive.

12. An improvement to an adaptive braking control channel including a constant current source as recited in claim 8 wherein said constant current source comprises a transistor having a base electrode connected to said constant voltage source, and a collector-emitter circuit connected between said means for generating a second signal and said charge storage device.

13. An improvement to an adaptive braking control channel as recited in claim 12 wherein:
said charge storage device comprises a capacitor; and,
said normally conductive means comprises a second transistor having a collector-emitter circuit shunting said capacitor and a base electrode connected to said means for generating a third signal.

14. An improvement to an adaptive braking control channel as recited in claim 13 with additionally resistance means in said second transistor collector-emitter circuit for inhibiting discharge of said capacitor.

* * * * *